United States Patent [19]
Berstis

[11] Patent Number: 6,018,345
[45] Date of Patent: *Jan. 25, 2000

[54] CURSOR CHANGE INDICATION OF LINKS IN DOCUMENT INTERFACE

[75] Inventor: Viktors Berstis, Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/801,661

[22] Filed: Feb. 18, 1997

[51] Int. Cl.$^7$ .............................. G06F 3/14; G06F 3/033
[52] U.S. Cl. ........................ 345/357; 345/145; 345/336; 707/501
[58] Field of Search .................................... 345/357, 145, 345/354, 348, 336, 338, 327, 328, 334; 707/501, 513, 901

[56] References Cited

U.S. PATENT DOCUMENTS

| | | | |
|---|---|---|---|
| 5,197,124 | 3/1993 | Busboom et al. | 345/331 |
| 5,230,063 | 7/1993 | Hoeber et al. | 345/354 |
| 5,276,797 | 1/1994 | Bateman et al. | 345/145 X |
| 5,367,316 | 11/1994 | Ikezaki | 345/158 |
| 5,488,685 | 1/1996 | Palmer et al. | 345/338 |
| 5,524,195 | 6/1996 | Clanton, III et al. | 345/327 |
| 5,526,478 | 6/1996 | Russell, Jr. et al. | 345/348 X |
| 5,638,523 | 6/1997 | Mullet et al. | 345/357 X |
| 5,655,093 | 8/1997 | Frid-Nielsen | 345/334 X |
| 5,675,390 | 10/1997 | Schindler et al. | 345/327 |
| 5,710,897 | 1/1998 | Schneider | 345/334 |
| 5,806,077 | 9/1998 | Wecker | 707/501 |
| 5,854,630 | 12/1998 | Nielsen | 345/357 X |

OTHER PUBLICATIONS

Brown et al., *Special Edition Using Netscape 2*, Que Corporation, 1995, pp. 20–23, 148–152.

XP–002066526 Basic Operation of the Workplace shell, OS/2 V2.0, vol. 3, p. 56.

Patent Abstracts of Japan—Publication Date, Jun. 12, 1986, Icon Menu Control Device, Kobayashi Masaaki.

IBM Technical Disclosure Bulletin, vol. 39 No. 10 Oct. 1996, Cursor–Tracking Highlighter, XP 000631385, pp. 211–213.

IBM Technical Disclosure Bulletin, vol. 28, No. 6 Nov. 1985, XP002066525, Button Interface With Visual Cues, pp. 2648–2649.

Patent Abstracts of Japan, Publication No. 62011927, Publication Date Jan. 20, 1987, Cursor Menu Controller, Kobayashi Masaaki.

IBM Technical Disclosure Bulletin, vol. 28, No. 6 Nov. 1985, Button Interface With Visual Cues, pp. 2648–2649.

*Primary Examiner*—Raymond J. Bayerl
*Attorney, Agent, or Firm*—Jeffrey S. LaBaw

[57] ABSTRACT

Alternatively displaying links within a hypertext document such as the World Wide Web document on the Internet is accomplished. The movement and presentation of the cursor is used to indicate the presence of the links and means of traversing the links. The cursor is presented in a first manner while the cursor is over nonlink elements in the first page. As the cursor is moved over the link, the cursor is presented in a second manner indicating to a user how to traverse to the second page. In a preferred embodiment, the cursor, when presented in the second manner, includes characters from a first key on an input device which when activated will cause the computer to traverse to the second page.

8 Claims, 7 Drawing Sheets

CURSOR CHANGE INDICATION OF LINKS IN DOCUMENT INTERFACE

BACKGROUND OF THE INVENTION

The present invention relates generally to data processing systems. More particularly, it relates to a control mechanism for a graphical user interface.

It has long been an objective of the designers of computer systems to make their systems more accessible, or "user friendly", to a diverse group of users. Heretofore, this group of users possessed a sufficient desire or need to learn and adapt their behavior to a user interface.

While the Internet as a cultural phenomenon has raised the awareness to the tremendous information available to computer users, the largest segment of the public has yet to learn how to access these resources. Such consumers are either unmotivated, unable or too fearful to acquire the needed skills to access the Internet by conventional computer interfaces. Also, the cost of a conventional system is too high a hurdle for many. The need for low cost data processing systems which are simple to operate is being addressed to some extent by "WebTV" and similar systems. These systems are collectively known as Internet appliances.

The intended audience of the Internet appliance is such that it is expected that prior techniques for using computer interfaces would be unacceptable. Many of these consumers do not like the idea of owning a computer. The goal is to make interface as intuitive and nontechnical as possible. Preferably, the user is unaware that the interface is presented by a computer at all.

One of the problems associated with a normal user interface is that user may be unaware of the options available to him if certain portions of the interface are activated. This problem is traditionally dealt with by help programs or documentation online which must be manually called by the user. However, the novice user is fearful of pressing buttons and activating such features because it may send a computer into an unknown and possibly unrecoverable state. Therefore, the challenge is to inform the user of the possibilities within the interface and how to take advantage of those options, yet without requiring the user to enter any sort of help state or mode.

The present invention described below describes one solution to this problem.

SUMMARY OF THE INVENTION

Therefore it is an object of this invention to provide an intuitive means of informing the user as to the options available in a user interface.

It is another object of the invention to inform the user without requiring entry into particular state or activiation of any input device. These and other objects of the invention are accomplished by a system, method and computer for displaying a hypertext document such as the World Wide Web document on the Internet containing a plurality of web pages. A display presents the pages in the document and links between pages within each page.

The presence of a link within a first page to a second page is typically encoded within the document. The presence of the link is presented in an intuitive manner through movement of the cursor. The cursor is presented in a first manner while the cursor is over nonlink elements in the first page. As the cursor is moved over the link, the cursor is presented in a second manner indicating to a user how to traverse to the second page. In a preferred embodiment, the cursor, when presented in the second manner, includes characters from a first key on an input device which when activated will cause the computer to traverse to the second page.

The invention outlined above as well as additional objects, features and advantages of the present invention will be more readily understood with reference to the following detailed description.

BRIEF DESCRIPTION OF THE DRAWINGS

The invention will be best understood with reference to the following drawings.

DETAILED DESCRIPTION OF THE PREFERRED EMBODIMENT

Figure 1A:
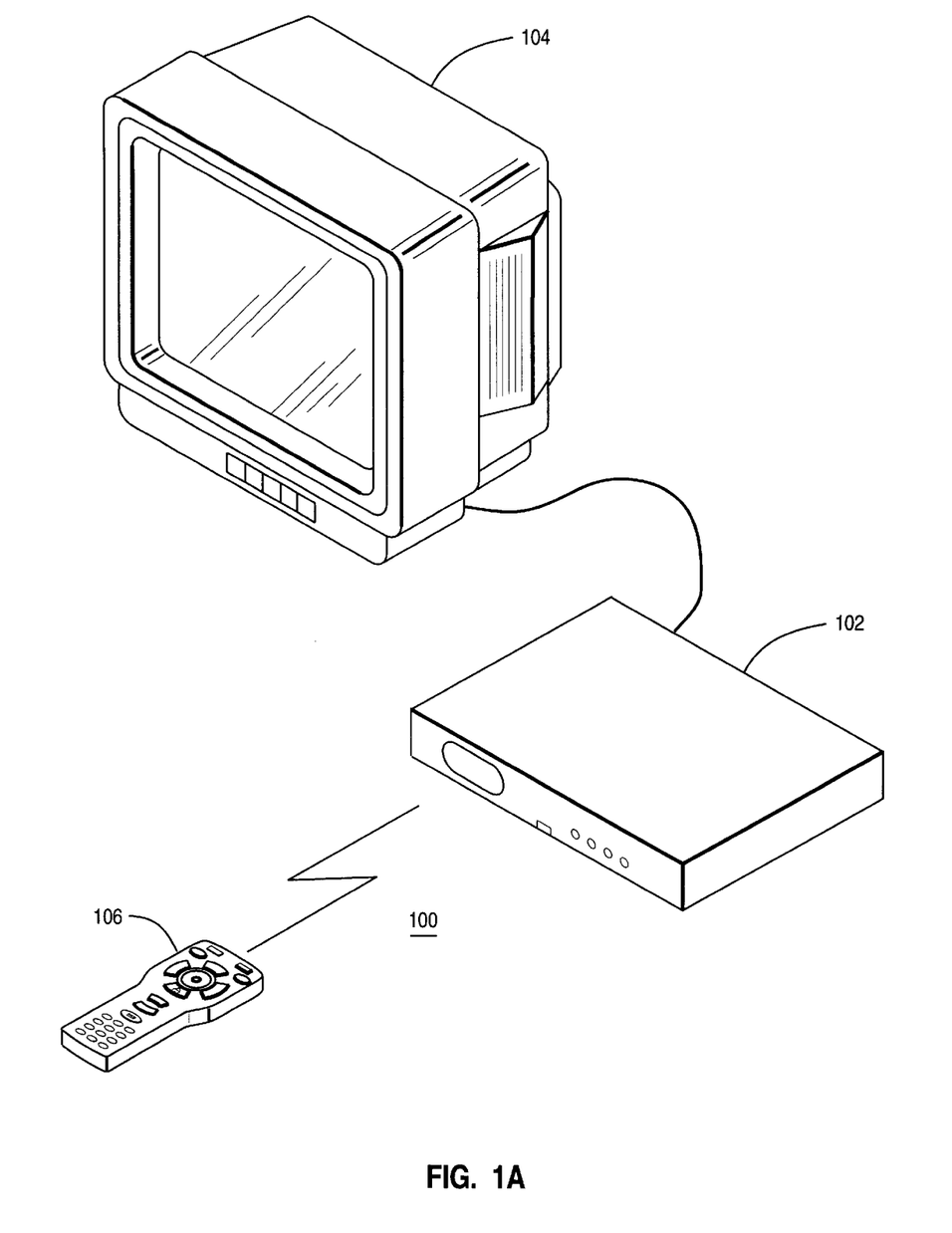
FIGS. 1A–1D depict various pictorial representations of a data processing system in which the present invention may be implemented.

With reference now to the figures and in particular with reference to FIGS. 1A through 1D, various pictorial representations of a data processing system in which a preferred embodiment of the present invention may be implemented are depicted. FIG. 1A is a pictorial representation of the data processing system as a whole. The data processing system 100 in the depicted example is an Internet appliance, providing, with minimal economic cost in hardware to the user, access to the Internet. The data processing system 100 includes a data processing unit 102. The data processing unit 102 is preferably sized to fit in typical entertainment centers and provides all required functionality which is conventionally found in personal computers to enable a user to "browse" the Internet. In addition, the data processing unit 102 may provide other common functions such as serving as an answering machine or receiving facsimile transmissions.

The data processing unit 102 is connected to the television 104 for display of graphical information. The television 104 may be any suitable television, although color televisions with an S-Video input will provide better presentations of the graphical information. The data processing unit 102 may be connected to television 104 through a standard coaxial cable connection. A remote control unit 106 allows a user to interact with and control data processing unit 102. The remote control unit 106 emits infrared (IR) signals, preferably with a different bar code pattern than the normal television, stereo, and VCR. The remote control unit 106 provides the functionality of a pointing device in conventional personal computers, including the ability to move a cursor on a display and select items.

Figure 1B:
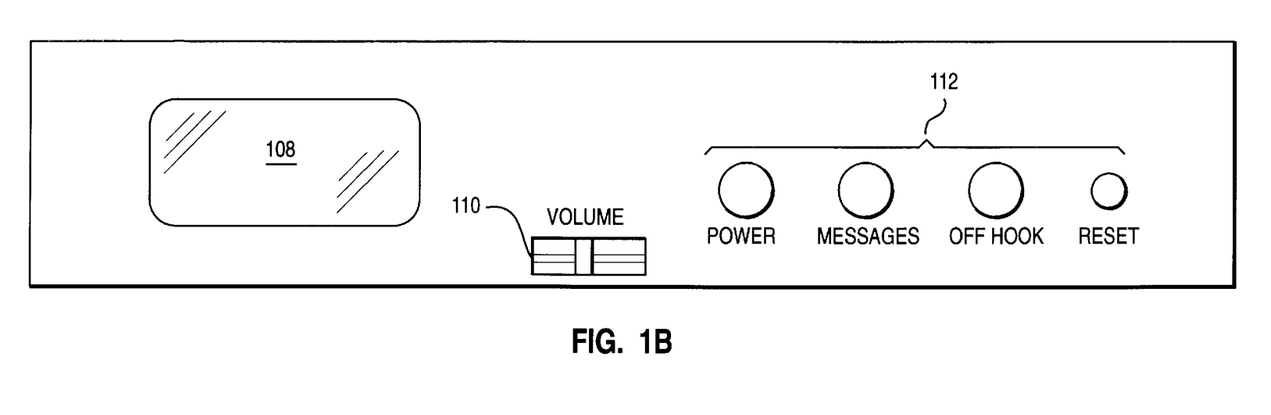

FIG. 1B is a pictorial representation of the front panel of data processing unit 102 according to with a preferred embodiment of the present invention. The front panel includes an infrared window 108 for receiving signals from the remote control unit 106 and for transmitting infrared signals. The data processing unit 102 may transmit infrared signals to be reflected off objects or surfaces, allowing data processing unit 102 to automatically control the television 104 and other infrared remote controlled devices. The volume control 110 permits adjustment of the sound level emanating from a speaker within the data processing unit 102. A plurality of light-emitting diode (LED) indicators 112 provide an indication to the user of when data processing unit 102 is on, whether the user has messages, whether the modem/phone line is in use, or whether data processing unit 102 requires service.

Figure 1C:
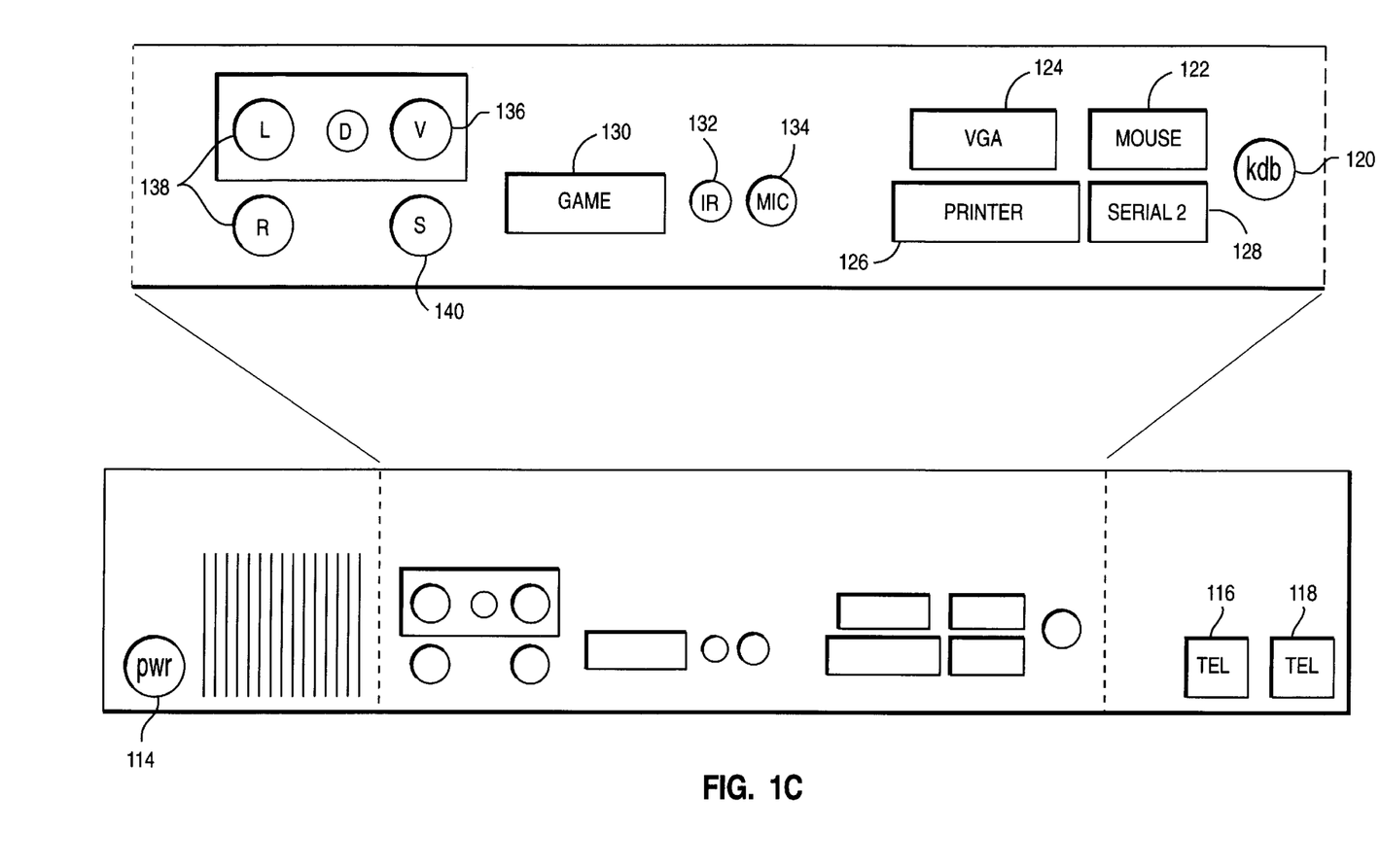

FIG. 1C is a pictorial representation of the rear panel of the data processing unit 102 in a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow the data processing unit 102 to operate in the manner of a conventional personal computer. The game port 130 on the rear panel provides a connection for a joystick or other gaming control device (glove, etc.). The infrared extension jack 132 allows a cabled infrared LED to be utilized to transmit infrared signals. The microphone jack 134 allows an external microphone to be connected to the data processing unit 102.

The video connection 136, a standard coaxial cable connector, connects to the video-in terminal of the television 104 or a video cassette recorder (not shown). Left and right audio jacks 138 connect to the corresponding audio-in connectors on the television 104 or to a stereo (not shown). If the user has S-Video input, then S-Video connection 140 may be used to connect to the television 104 to provide a better picture than the composite signal. If the television 104 has no video inputs, an external channel 3/4 modulator (not shown) may be connected in-line with the antenna connection.

Figure 1D:
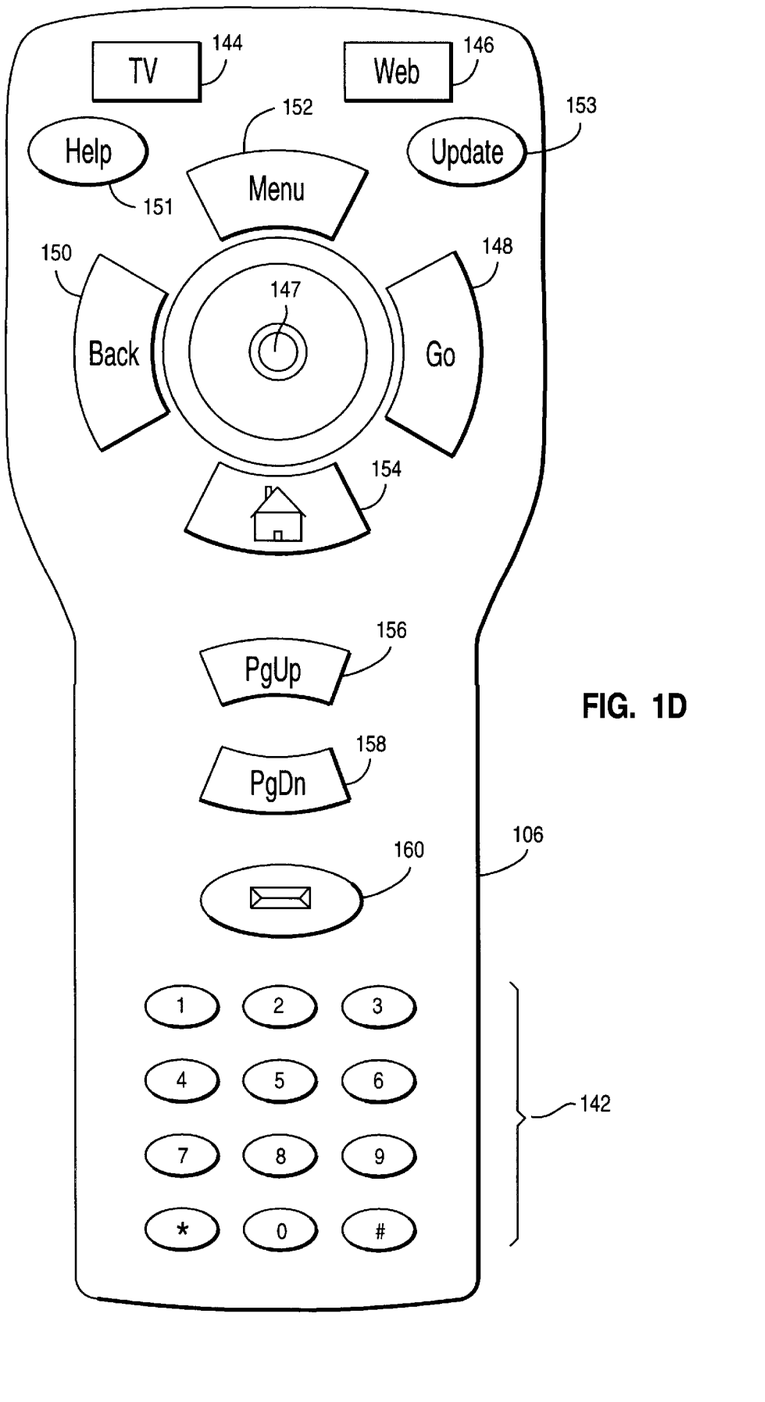

FIG. 1D is a pictorial representation of the remote control unit 106 according to a preferred embodiment of the present invention. Similar to a standard telephone keypad, the remote control unit 106 includes buttons 142 for arabic numerals 0 through 9, the asterisk or "star" symbol (*), and the pound sign (#). The remote control unit also includes a "TV" button 144 for selectively viewing television broadcasts and a "Web" button 146 for initiating "browsing" of the Internet. Pressing the "Web" button 146 will cause the data processing unit 102 to initiate modem dial-up of the user's Internet service provider and display the start-up screen for an Internet browser.

A pointing device 147, which is preferably a trackpoint or "button" pointing device, is included on the remote control unit 106 and allows a user to manipulate a cursor on the display of the television 104. The "Go" and "Back" buttons 148 and 150, respectively allow a user to select an option or return to a previous selection. In particular in the Internet context, the "GO" button 148 refers to traversing a link, i.e. going to the page, over which the cursor is located. The "Back" button 150 returns the user to the page just previously visited. The "Help" button 151 causes context-sensitive help to be displayed or otherwise provided. A "Menu" button 152 causes a context-sensitive menu of options to be displayed, and an "Update" button 153 will update the options displayed based on the user's input, while the "Home" button 154 allows to user to return to a default display of options. "PgUp" and The "PgDn" buttons 156 and 158 allows the user to change the content of the display in display-sized blocks rather than by scrolling. The "Message" button 160 allows the user to retrieve messages.

In addition to, or in lieu of, the remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through the mouse port 122. When a user has one or more of the remote control unit 106, the infrared keyboard, the wired keyboard and/or wired pointing device operable, the active device locks out all others until a prescribed period of inactivity has passed.

Figure 2:
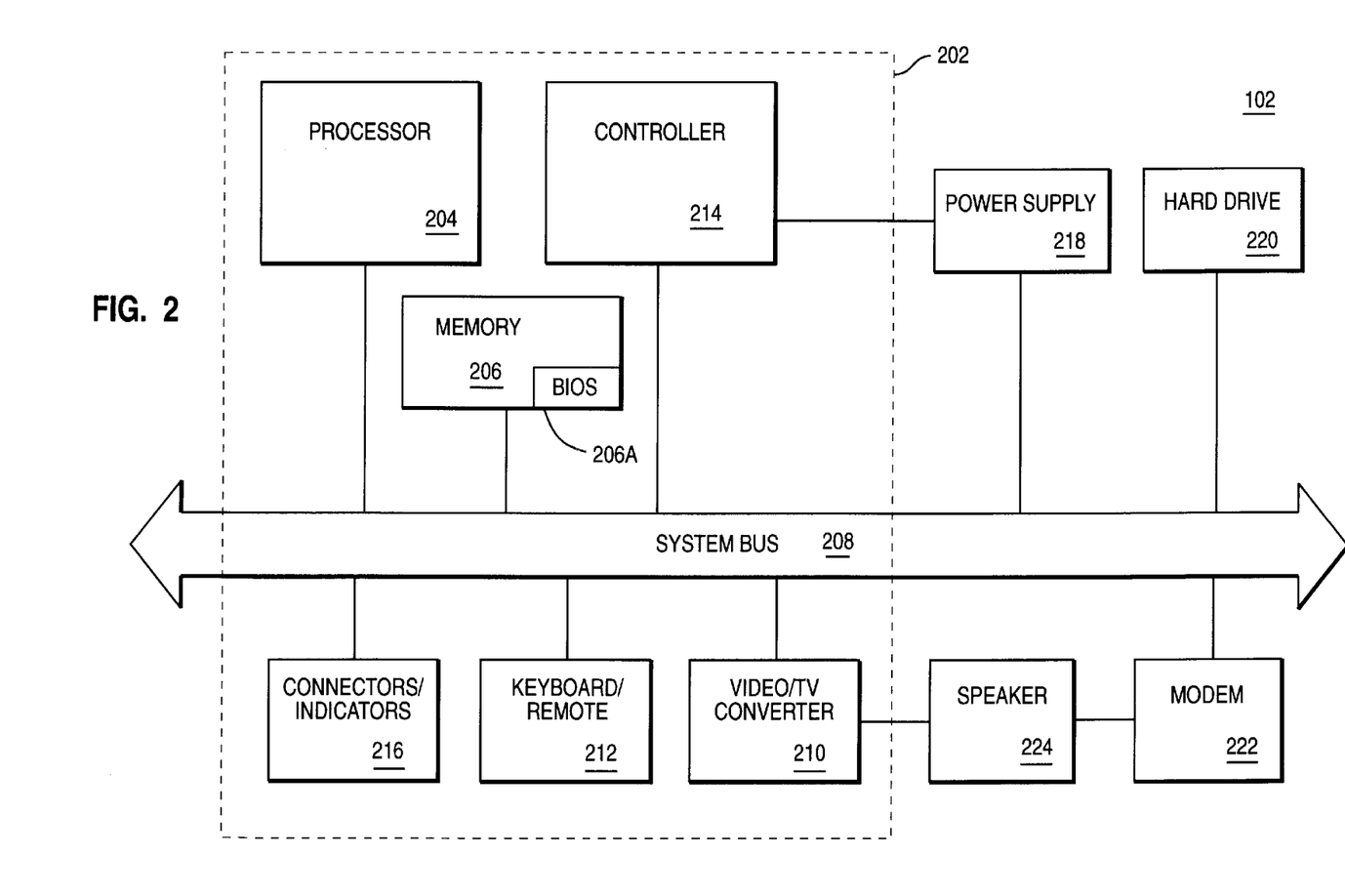
FIG. 2 is an architectural block diagram for the major components for a data processing unit designed according to one embodiment of the present invention.

Referring now to FIG. 2, a block diagram for the major components of data processing unit 102 in a preferred embodiment of the present invention is portrayed. As with conventional personal computers, data processing unit 102 includes a motherboard 202 containing a processor 204 and memory 206 connected to system bus 208. The processor 204 is preferably at least a 486-class processor operating at or above 100 MHz. Memory 206 may include cache memory and/or video RAM. The processor 204, the memory 206, and the system bus 208 operate in the same manner as corresponding components in a conventional data processing system.

The video/TV converter 210, located on the motherboard 202 and connected to the system bus 208, generates computer video signals for computer monitors, a composite television signal, and an S-Video signal. The functionality of video/TV converter 210 may be achieved through a Trident TVG9685 video chip in conjunction with an Analog Devices AD722 converter chip. The video/TV converter 210 may require loading of special operating system device drivers.

The keyboard/remote control interface unit 212 on the motherboard 202 receives keyboard codes through the controller 214, regardless of whether a wired keyboard/pointing device or an infrared keyboard/remote control is being employed. The infrared remote control unit 106 transmits signals which are ultimately sent to the serial port as control signals generated by conventional mouse or pointing device movements. Two buttons on the remote control unit 106 are interpreted identically to the two buttons on a conventional mouse, while the remainder of the buttons transmit signals corresponding to keystrokes on an infrared keyboard. Thus, the remote control unit 106 has a subset of the functions provided by an infrared keyboard.

Connectors/indicators 216 on the motherboard 202 provide some of the connections and indicators on data processing unit 102 described above. Other connections are associated with and found on other components. For example, telephone jacks 116 and 118 are located on the modem 222. The power indicator within connectors/indicators 216 is controlled by the controller 214.

External to the motherboard 202 in the depicted example are the power supply 218, the hard drive 220, the modem 222, and the speaker 224. The power supply 218 is a conventional power supply except that it receives a control signal from the controller 214 which effects shut down of all power to the motherboard 202, the hard drive 220, and the modem 222. In some recovery situations, removing power and rebooting is the only guaranteed method of resetting all of these devices to a known state. Thus, the power supply 218, in response to a signal from the controller 214, is capable of powering down and restarting the data processing unit 102.

The hard drive 220 contains operating system and applications software for data processing unit 102, which preferably includes: IBM DOS 7.0, a product of International Business Machines Corporation in Armonk, New York; Windows 3.1, a product Microsoft Corporation in Redmond, Wash.; and Netscape Navigator, a product of Netscape Conmunications Corporation in Mountain View, Calif. Minor modifications of these software packages may be desirable to optimize performance of data processing unit 102. Hard drive 220 may also store data, such as list of favorite Internet sites or unviewed downloads from an Internet site. One of the preferred implementations of the invention is as sets of instructions resident in the random access memory of the computer system configured generally as described above. Until required by the computer system, the set of instructions may be stored in another computer memory, for example, in the hard disk 220. Although an Internet appliance will not generally use removable memory to minimize cost, the invention does have application to other general purpose computer systems in which removable memory is used. The sets of instructions may be stored in a removable memory such as an optical disk for eventual use in a CD-ROM drive or a floppy disk for eventual use in a floppy disk drive. The program may also be stored in the memory of another computer system to be sent over the network such as an external network as the Internet when desired. For example, the operating system of the Internet appliance can be updated remotely.

The modem 222 may be any suitable modem used in conventional data processing systems, but is preferably a 33.6 kbps modem supporting the V.42bis, V34bis, V.34, V.17 Fax, MNP 1–5, and AT command sets. To maintain the slim height of the data processing system 102, the modem 222 is preferably inserted into a slot mounted sideways on the motherboard 202.

The controller 214 is preferably one or more of the 805× family controllers. The controller 214 receives and processes input from the infrared remote control 106, the infrared keyboard, the wired keyboard, or the wired mouse. When one keyboard or pointing device is used, all others are locked out (ignored) until none have been active for a prescribed period. Then the first keyboard or pointing device to generate activity locks out all others. The controller 214 also directly controls all LED indicators except that indicating modem use. As part of the failure recovery system, the controller 214 specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3A:
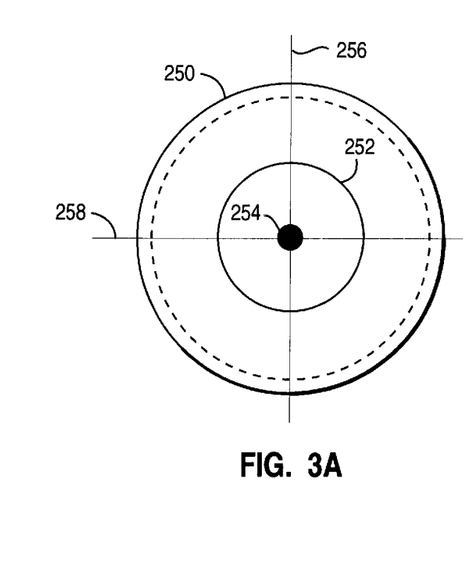
FIGS. 3A–3B depict preferred embodiments of the cursor or pointer icon in a normal presentation and in a presentation over an Internet link.
Figure 3B:
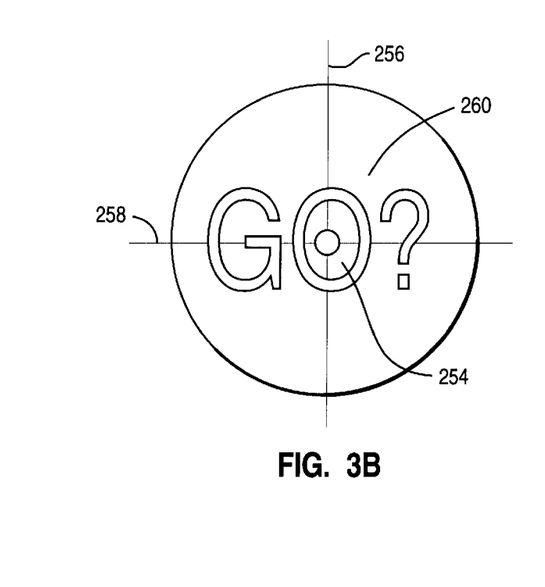

FIGS. 3A and 3B show a preferred embodiment of the cursor or pointer icon in the interface displayed in a normal manner and displayed in a "GO? cursor" mode respectively. Referring to FIG. 3A, the cursor is displayed as an animated crosshair when it is over a portion of the web page which is not linked to another web page. While the pointer icon might be displayed conventionally as an arrow as is typical in a computer interface, the animated crosshair cursor is more intuitive. It is easier for a novice user to readily appreciate a location of the hot spot 254, the concentric circles 250, 252 and crosshairs 256, 258 guide the eye to the hot spot of the cursor. Animation to the circles, crosshairs and hot spot can be added to the cursor to guide the user's eye to the center of the cursor. The cursor has the so called normal appearance when it is in a position in the interface where no link is present.

Once the cursor is moved over a link, the presentation of the cursor switches to that depicted in FIG. 3B. As shown, this cursor retains the blinking hot point 254 and cross hairs 256 and 258. However, much of the interior of circle 250 has been replaced by the characters "GO?". The reader will remember that there is a "GO" button on the remote control and possibly on the keyboard as well. The linkage of the meaning of the word "GO", i.e. "do you want to "go" to this link?", its presence in the interface and the "GO" button on the remote control, makes this presentation of the pointer icon so intuitive to the novice user. The appearance of the pointer icon, either in whole or in part, could also be painted to closely resemble the actual button on the remote or keyboard. One skilled in the art would readily appreciate that other words or characters could be substituted for the word "GO" in the cursor.

Figure 4:
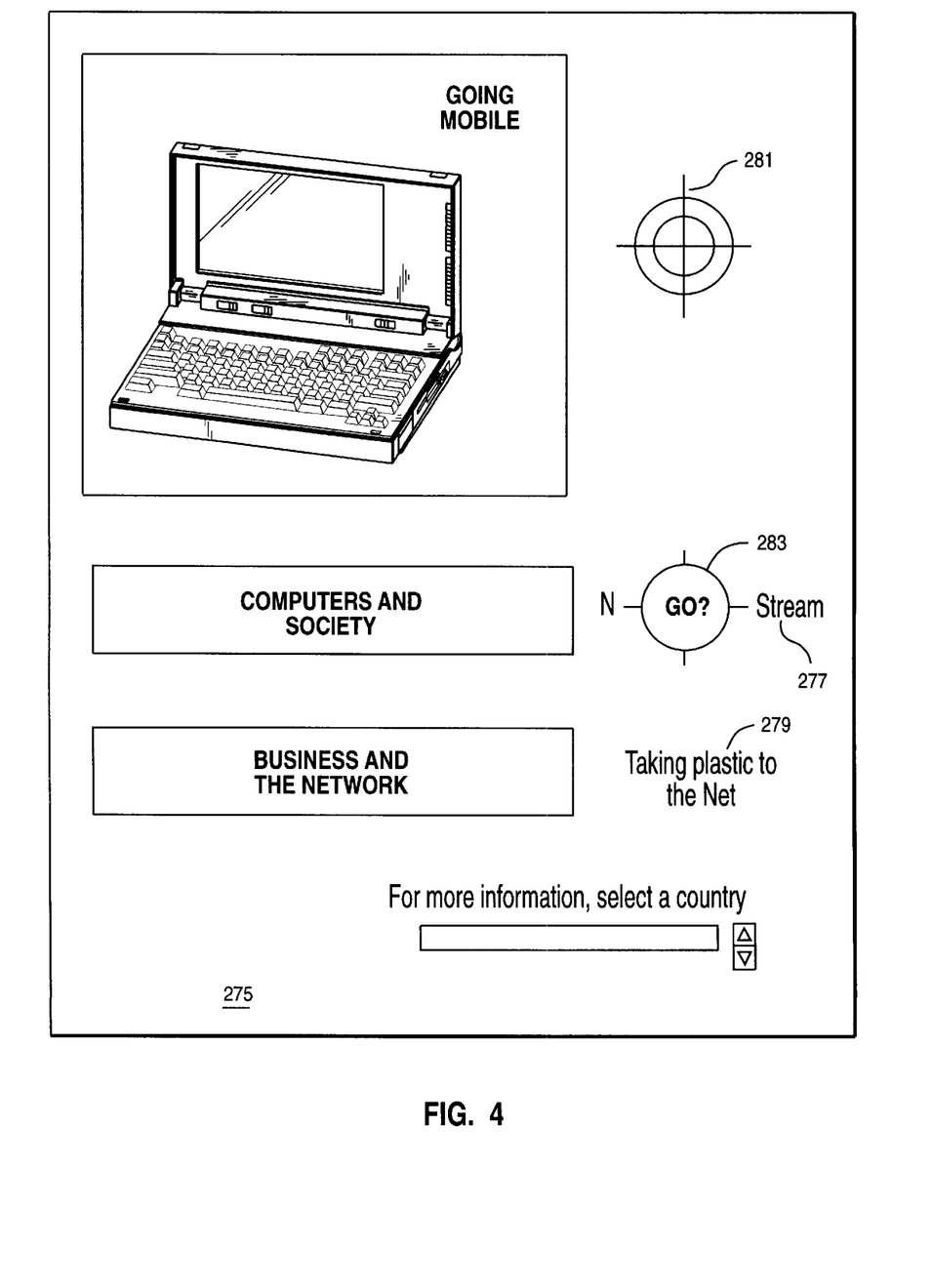
FIG. 4 depicts a cursor as it is moved through a user interface.

FIG. 4 shows the cursor as it moves to several positions in a user interface. Web page 275 has a plurality of links 277, 279. First, the cursor is shown at position 281 presented in its normal manner. As it is subsequently moved by manipulation of the trackpoint on the remote control to position 283 over a link 277, its appearance changes to the "GO" presentation. One skilled in the art would appreciate that two cursors are not typically displayed in the user interface simultaneously and that the figure is a summary of two different moments in time with a single cursor. At each point in time, the cursor is displayed in a single manner dependent upon its position in the interface.

Figure 5:
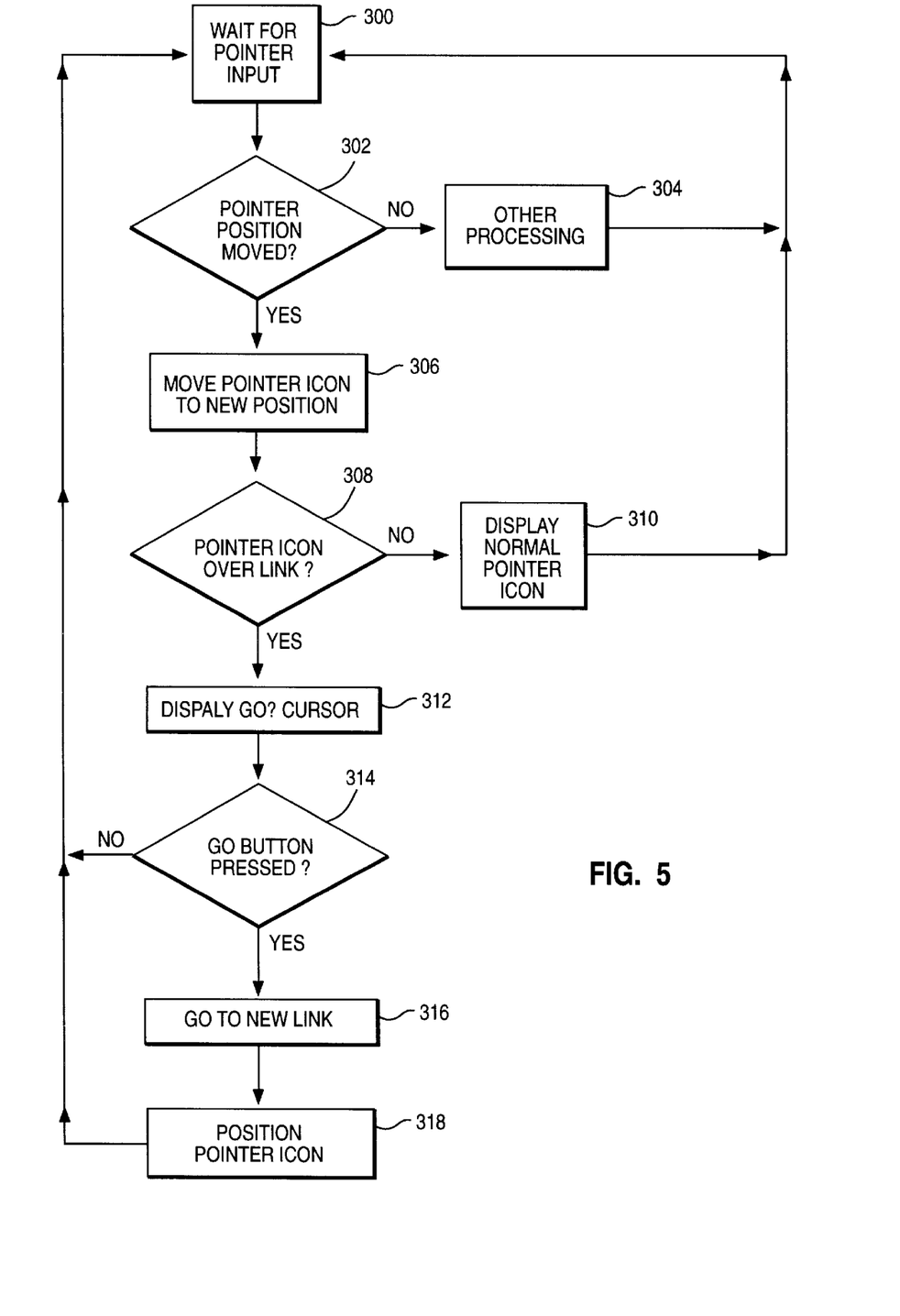
FIG. 5 is a flow diagram for the processes taken by the system as the cursor is moved in the interface.

The process for displaying the cursor as it moves in the interface is shown in FIG. 5. In step 300, the interface waits for pointer input. After such input is received, in step 302, the operating system has determined that an event has occurred and tests whether the input is for moving the pointer position. If not, in step 304 other processing occurs and the system returns to step 300 to wait for pointer input. If the pointer position has moved, in step 306, the pointer is moved to a new position. In step 308, a test determines whether the pointer icon is over a link in an Internet Web page. This information is obtained by querying an Internet browser such as Netscape Navigator which is part of the preferred embodiment of this invention. In Hypertext Markup Language (HTML), the links are coded into each Web page. If the pointer icon is not over a link, in step 310 a normal presentation of the pointer icon occurs and the system returns to wait for further input.

However, if the pointer icon is over a link, the "GO" cursor is displayed in step 312. In step 314, the system determines whether the "GO" button was pressed. If not, the system waits for further input in step 300. If the "GO" button is pressed, in step 316, the system goes to the page specified by the link and repaints the screen. The pointer is positioned within the new page in step 318. The pointer may be automatically positioned over a link in the page, and therefore, presented in the "GO" presentation. Alternatively, it may be positioned automatically over an ordinary space in the page and presented in its normal manner.

While the invention has been shown and described with reference to particular embodiments thereof, it will be understood by those skilled in the art that the foregoing and other changes in form and detail may be made therein without departing from the spirit and scope of the invention. For example, the "GO" presentation of the cursor may be invoked at any entry field in which data is to be entered.

What is claimed is:

1. A method for indicating in a computer user interface for a novice user a web link within a first web page to a second web page, comprising the steps of:

presenting a cursor in a first manner while the cursor is over ordinary elements in the first web page; and responsive to movement of the cursor over the web link, presenting the cursor in a second manner indicating characters from a first key on a remote control incorporating a pointing device which when activated will cause the computer to retrieve the second web page.

2. A system for displaying a hypertext document, the system including processor, memory and input device, comprising:

means for presenting a plurality of pages in the hypertext document and links between pages within each page on a display;

means for indicating the presence of a link within a first page to a second page;

means for presenting a cursor in a first manner while the cursor is over nonlink elements in the first page; and means responsive to movement of the cursor over the link for presenting the cursor in a second manner showing a user characters from a first key to depress on a remote control input device to traverse to the second page.

3. The system as recited in claim 2, wherein the hypertext document is located in a World Wide Web on an Internet and the plurality of pages are a plurality of web pages.

4. The system as recited in claim 2 wherein the input device is a remote control incorporating a pointing device to move the cursor and further incorporating the first key.

5. A computer program product in a computer readable medium for allowing a novice user to navigate in a World Wide Web document presented in a user interface on a computer comprising:

means for presenting a plurality of web pages in the hypertext document and links between web pages within each page on a computer display;

means for sensing the presence of a link within a first web page to a second web page;

means for presenting a cursor in a first manner while the cursor is over nonlink elements in the first web page; and means responsive to movement of the cursor over the link for presenting the cursor in a second manner wherein at least a portion of the cursor resembles a key on a remote control input device which when depressed will cause the presenting means to traverse to the second web page.

6. A method for indicating in a computer user interface how to cause a computer to perform an operation, comprising the steps of:

presenting a cursor in a first manner while the cursor is over elements in the user interface not associated with an operation; and responsive to movement of the cursor over an element, determining that a computer operation is associated with the element;

presenting the cursor in a second manner showing a first key on a remote control input device needed to activate the computer operation.

7. The method as recited in claim 6, wherein the element is a link in a hypertext document is located in a World Wide and the computer operation is to retrieve a referenced document from the World Wide Web according data referenced by the link.

8. The system as recited in claim 6 wherein the remote control incorporates a pointing device to move the cursor.

* * * * *